(12) United States Patent
Gelbard et al.

(10) Patent No.: US 8,725,724 B2
(45) Date of Patent: May 13, 2014

(54) METHOD FOR EFFICIENT ASSOCIATION OF MULTIPLE DISTRIBUTIONS

(76) Inventors: Roy Gelbard, Tel Aviv (IL); Ran M. Bittmann, Tel Aviv (IL)

( * ) Notice: Subject to any disclaimer, the term of this patent is extended or adjusted under 35 U.S.C. 154(b) by 157 days.

(21) Appl. No.: 12/388,924

(22) Filed: Feb. 19, 2009

(65) Prior Publication Data

US 2009/0210446 A1    Aug. 20, 2009

Related U.S. Application Data

(60) Provisional application No. 61/064,130, filed on Feb. 19, 2008.

(51) Int. Cl.
*G06F 7/00*    (2006.01)
(52) U.S. Cl.
USPC ........................................................ 707/723
(58) Field of Classification Search
USPC ........................ 707/705, 723, 726
See application file for complete search history.

(56) References Cited

U.S. PATENT DOCUMENTS

| | | | |
|---|---|---|---|
| 8,190,592 B1 * | 5/2012 | Bayardo et al. | 707/706 |
| 2004/0107223 A1 * | 6/2004 | Uno et al. | 707/200 |
| 2008/0071843 A1 * | 3/2008 | Papadimitriou et al. | 707/204 |
| 2008/0281814 A1 * | 11/2008 | Calistri-Yeh et al. | 707/5 |

\* cited by examiner

*Primary Examiner* — Truong Vo
(74) *Attorney, Agent, or Firm* — Browdy and Neimark, PLLC

(57) ABSTRACT

An association method for analyzing a dataset and grouping its objects in homogeneous groups. Multiple grouping algorithms of the art are performed against the dataset, each producing its own grouping results. All the distributions (groupings) are ordered in a matrix, where each distribution suggested by a specific algorithm and/or parameters is presented in a column of the matrix, and each object is presented in a row of the matrix. The association method is applied to the grouping results and associates similar groups among different grouping methods. The best grouping of the objects is determined according to one or more quality criteria. The various grouping results are represented by colors in the matrix such that similar colors, even on different rows, represent similar grouping recommendations.

20 Claims, 15 Drawing Sheets

| Cluster | Algorithm A | Algorithm B |
|---|---|---|
| C1 | 1, 2, 3 | 1, 4, 5 |
| C2 | 4, 5 | 7, 8 |
| C3 | 6, 7, 8 | 2, 3, 6 |

| Cluster | Algorithm A | Algorithm B |
|---|---|---|
| C1 | 1, 2, 3 | 1, 4, 5 |
| C2 | 4, 5 | 7, 8 |
| C3 | 6, 7, 8 | 2, 3, 6 |

| Site | Group | Between Groups | Within Groups | Nearest Neighbor | Centroid | Ward | BIC |
|---|---|---|---|---|---|---|---|
| Argentina | 1 | 1 | 1 | 1 | 1 | 1 | 0 |
| Mexico | 1 | 1 | 1 | 1 | 1 | 1 | 0 |
| Philippines | 1 | 1 | 1 | 1 | 1 | 1 | 0 |
| Germany | 2 | 4 | 4 | 4 | 4 | 4 | 0 |
| Italy | 2 | 4 | 4 | 4 | 4 | 4 | 0 |
| Australia | 3 | 2 | 2 | 2 | 2 | 2 | 0 |
| British Hong Kong | 3 | 2 | 2 | 2 | 2 | 2 | 0 |
| Japan | 3 | 2 | 2 | 2 | 2 | 2 | 0 |
| United States | 3 | 2 | 2 | 2 | 2 | 2 | 0 |
| New Zealand | 4 | 10 | 10 | 10 | 10 | 10 | 0 |
| South Africa | 4 | 11 | 10 | 11 | 11 | 11 | 0 |
| Morocco | 5 | 9 | 9 | 9 | 9 | 9 | 0 |
| Taiwan | 5 | 9 | 9 | 9 | 9 | 9 | 0 |
| Ireland | 6 | 6 | 6 | 6 | 6 | 6 | 0 |
| Brazil | 7 | 3 | 3 | 3 | 3 | 3 | 0 |
| Greek Cyprus | 8 | 5 | 5 | 5 | 5 | 5 | 0 |
| Korea | 9 | 7 | 7 | 7 | 7 | 7 | 0 |
| Malaysia | 10 | 8 | 8 | 8 | 8 | 8 | 0 |
| Switzerland | 11 | 11 | 11 | 11 | 11 | 11 | 0 |
|  |  |  |  |  |  |  | 0 |

Merritt's Clustering into 11 Clusters

Cluster Membership

| Case | Power Group | Uncertainty Group | Gender Group | Time Context | Ward | GCI |
|---|---|---|---|---|---|---|
| Brazil | 1 | 1 | 1 | 2 | 1 | 0 |
| Argentina | 1 | 1 | 1 | 1 | 1 | 1 |
| Mexico | 1 | 1 | 1 | 1 | 1 | 1 |
| Philippines | 1 | 1 | 1 | 1 | 1 | 1 |
| Malaysia | 1 | 1 | 1 | 3 | 1 | 1 |
| Greek Cyprus | 1 | 1 | 1 | 3 | 1 | 4 |
| Germany | 3 | 3 | 3 | 3 | 3 | 1 |
| Italy | 3 | 3 | 3 | 3 | 3 | 1 |
| Morocco | 3 | 3 | 4 | 3 | 4 | 1 |
| Taiwan | 3 | 3 | 4 | 3 | 4 | 1 |
| Korea | 4 | 4 | 4 | 4 | 4 | 1 |
| Switzerland | 2 | 2 | 3 | 1 | 3 | 4 |
| Australia | 2 | 2 | 2 | 1 | 2 | 0 |
| British Honk Kong | 2 | 2 | 2 | 1 | 2 | 0 |
| Ireland | 2 | 2 | 2 | 1 | 2 | 0 |
| Japan | 2 | 2 | 2 | 1 | 2 | 0 |
| New Zealand | 2 | 2 | 2 | 1 | 2 | 0 |
| South Africa | 2 | 2 | 2 | 1 | 2 | 0 |
| United States | 2 | 2 | 3 | 1 | 2 | 0 |
|  |  |  |  |  |  | 17 |

Merritt's Clustering into 4 clusters

Fig. 8

Cluster Membership

| Case | Between Groups | Within Groups | Contract Navigator | Canova | VISL | 5V2 |
|---|---|---|---|---|---|---|
| Argentina | 1 | 1 | 1 | 1 | 1 | 1 |
| Mexico | 1 | 1 | 1 | 1 | 1 | 1 |
| Philippines | 1 | 1 | 1 | 1 | 1 | 1 |
| Brazil | 1 | 1 | 1 | 2 | 3 | 1 |
| Germany | 3 | 3 | 3 | 3 | 3 | 1 |
| Italy | 3 | 3 | 3 | 3 | 3 | 1 |
| Morocco | 3 | 3 | 5 | 3 | 5 | 1 |
| Taiwan | 3 | 3 | 5 | 3 | 5 | 1 |
| Australia | 2 | 2 | 2 | 1 | 2 | 0 |
| British Honk Kong | 2 | 2 | 2 | 1 | 2 | 0 |
| Ireland | 2 | 2 | 2 | 1 | 2 | 0 |
| Japan | 2 | 2 | 2 | 1 | 2 | 0 |
| New Zealand | 2 | 2 | 2 | 1 | 2 | 0 |
| South Africa | 2 | 2 | 2 | 1 | 2 | 0 |
| United States | 2 | 2 | 2 | 1 | 2 | 0 |
| Switzerland | 2 | 2 | 3 | 5 | 4 | 9 |
| Malaysia | 4 | 5 | 4 | 3 | 3 | 1 |
| Greek Cyprus | 4 | 3 | 4 | 3 | 3 | 4 |
| Korea | 4 | 4 | 5 | 4 | 3 | 1 |
| | | | | | | 23 |

Merritt's Clustering into 5 clusters

Fig. 9

| Cluster Membership | | | | | | |
|---|---|---|---|---|---|---|
| | Academic Core | Admin Burden | Physical Campus & Content | | Cost | ROI |
| Argentina | 1 | 1 | 1 | 1 | 1 | 1 |
| Mexico | 1 | 1 | 1 | 1 | 1 | 1 |
| Philippines | 1 | 1 | 1 | 1 | 1 | 1 |
| Brazil | 1 | 1 | 3 | 2 | 3 | 4 |
| Germany | 3 | 3 | 4 | 3 | 4 | 1 |
| Italy | 3 | 3 | 4 | 3 | 4 | 1 |
| Switzerland | 6 | 2 | 4 | 6 | 4 | 4 |
| Australia | 2 | 2 | 2 | 1 | 2 | 0 |
| British Honk Kong | 2 | 2 | 2 | 1 | 2 | 0 |
| Ireland | 2 | 2 | 2 | 1 | 2 | 0 |
| Japan | 2 | 2 | 2 | 1 | 2 | 0 |
| New Zealand | 2 | 2 | 2 | 1 | 2 | 0 |
| South Africa | 2 | 2 | 2 | 1 | 2 | 0 |
| United States | 2 | 2 | 2 | 1 | 2 | 0 |
| Malaysia | 4 | 5 | 5 | 4 | 3 | 0 |
| Greek Cyprus | 4 | 5 | 5 | 4 | 5 | 1 |
| Korea | 5 | 6 | 6 | 5 | 5 | 1 |
| Morocco | 3 | 6 | 6 | 3 | 6 | 1 |
| Taiwan | 3 | 6 | 6 | 5 | 6 | 1 |
| | | | | | | 17 |

Merritt's Clustering into 6 clusters

Fig. 10

| City | | | | | | | |
|---|---|---|---|---|---|---|---|
| Argentina | 1 | 1 | 1 | 1 | 1 | 1 | 0 |
| Mexico | 1 | 1 | 1 | 1 | 1 | 1 | 0 |
| Philippines | 1 | 1 | 1 | 1 | 1 | 1 | 0 |
| Germany | 4 | 4 | 4 | | | 4 | 1 |
| Italy | 4 | 4 | 4 | | | 4 | 1 |
| Switzerland | 7 | 2 | 4 | | 7 | 4 | 4 |
| Australia | 2 | 2 | 2 | 2 | 2 | 2 | 0 |
| British Honk Kong | 2 | 2 | 2 | 2 | 2 | 2 | 0 |
| Ireland | 2 | 2 | 2 | 2 | 2 | 2 | 0 |
| Japan | 2 | 2 | 2 | 2 | 2 | 3 | 0 |
| New Zealand | 2 | 2 | 2 | 2 | 2 | 2 | 0 |
| South Africa | 2 | 2 | 2 | 2 | 2 | 2 | 0 |
| United States | 2 | 2 | 2 | 2 | 2 | 2 | 0 |
| Brazil | 3 | 3 | 3 | 3 | 3 | 3 | 0 |
| Korea | 6 | 6 | 6 | 6 | 6 | 6 | 0 |
| Greek Cyprus | 5 | 4 | 5 | 5 | 5 | 5 | 1 |
| Malaysia | 5 | 6 | 5 | 5 | 5 | 5 | 0 |
| Morocco | 4 | 7 | 7 | 4 | 3 | 3 | 1 |
| Taiwan | 4 | 7 | 7 | 4 | 7 | 7 | 1 |
| | | | | | | | 9 |

Merritt's Clustering into 7 clusters

Fig. 11

Cluster Membership

| Case | Groups | Groups Within Groups | Nearest Number | Prototype | More | SM |
|---|---|---|---|---|---|---|
| Argentina | 1 | 1 | 1 | 1 | 1 | 0 |
| Mexico | 1 | 1 | 1 | 1 | 1 | 0 |
| Philippines | 1 | 1 | 1 | 1 | 1 | 0 |
| Germany | 4 | 4 | 4 | 4 | 4 | 0 |
| Italy | 4 | 4 | 4 | 4 | 4 | 0 |
| Australia | 2 | 2 | 2 | 2 | 2 | 0 |
| British Honk Kong | 2 | 2 | 2 | 2 | 2 | 0 |
| Japan | 2 | 2 | 2 | 2 | 2 | 0 |
| United States | 2 | 2 | 2 | 2 | 2 | 0 |
| Ireland | 2 | 2 | 2 | 2 | 6 | 1 |
| New Zealand | 2 | 2 | 2 | 2 | 6 | 1 |
| South Africa | 2 | 2 | 2 | 2 | 6 | 1 |
| Brazil | 3 | 3 | 3 | 3 | 3 | 0 |
| Korea | 6 | 5 | 6 | 6 | 7 | 0 |
| Malaysia | 5 | 6 | 5 | 5 | 5 | 0 |
| Greek Cyprus | 5 | 4 | 5 | 5 | 5 | 1 |
| Morocco | 7 | 7 | 7 | 7 | 8 | 1 |
| Taiwan | 7 | 7 | 7 | 7 | 8 | 1 |
| Switzerland | 8 | 8 | 8 | 8 | 4 | 1 |
| | | | | | | 7 |

Merritt's Clustering into 8 clusters

Fig. 12

| Cluster Membership | | | | | | |
|---|---|---|---|---|---|---|
| Country | | | | Fashion | Music | Ego |
| Argentina | 1 | 1 | 1 | 1 | 1 | 0 |
| Mexico | 1 | 1 | 1 | 1 | 1 | 0 |
| Philippines | 1 | 1 | 1 | 1 | 1 | 0 |
| Germany | 4 | 4 | 4 | 4 | 4 | 0 |
| Italy | 4 | 4 | 4 | 4 | 4 | 0 |
| Australia | 2 | 2 | 2 | 2 | 2 | 1 |
| British Honk Kong | 2 | 2 | 2 | 2 | 2 | 1 |
| Japan | 2 | 2 | 2 | 2 | 2 | 1 |
| United States | 2 | 2 | 2 | 2 | 2 | 1 |
| Ireland | 2 | 2 | 6 | 2 | 6 | 1 |
| New Zealand | 2 | 2 | 6 | 2 | 6 | 1 |
| South Africa | 2 | 2 | 6 | 2 | 6 | 1 |
| Brazil | 3 | 3 | 3 | 3 | 3 | 0 |
| Korea | 6 | 6 | 7 | 6 | 7 | 0 |
| Morocco | 8 | 8 | 8 | 8 | 8 | 0 |
| Taiwan | 8 | 8 | 8 | 8 | 8 | 0 |
| Greek Cyprus | 5 | 5 | 5 | 5 | 5 | 1 |
| Malaysia | 7 | 7 | 5 | 7 | 5 | 1 |
| Switzerland | 9 | 9 | 9 | 9 | 9 | 0 |
| | | | | | | 9 |

Merritt's Clustering into 9 clusters

Fig. 13

| Cluster Membership | | | | | | |
|---|---|---|---|---|---|---|
| Case | Between Groups | Within Groups | Nearest Neighbor | Centroid | Ward | OW |
| Argentina | 1 | 1 | 1 | 1 | 1 | 0 |
| Mexico | 1 | 1 | 1 | 1 | 1 | 0 |
| Philippines | 1 | 1 | 1 | 1 | 1 | 0 |
| Germany | 4 | 4 | 4 | 4 | 4 | 0 |
| Italy | 4 | 4 | 4 | 4 | 4 | 0 |
| Australia | 2 | 2 | 2 | 2 | 2 | 0 |
| British Honk Kong | 2 | 2 | 2 | 2 | 2 | 0 |
| Japan | 2 | 2 | 2 | 2 | 2 | 0 |
| United States | 2 | 2 | 2 | 2 | 2 | 0 |
| Ireland | 6 | 2 | 6 | 6 | 6 | 1 |
| New Zealand | 6 | 9 | 6 | 6 | 6 | 0 |
| South Africa | 6 | 9 | 6 | 6 | 6 | 0 |
| Brazil | 3 | 3 | 3 | 3 | 3 | 0 |
| Greek Cyprus | 5 | 5 | 5 | 5 | 5 | 0 |
| Korea | 7 | 6 | 7 | 7 | 7 | 0 |
| Malaysia | 8 | 7 | 8 | 8 | 8 | 0 |
| Morocco | 9 | 8 | 9 | 9 | 9 | 0 |
| Taiwan | | | | | | 0 |
| Switzerland | 10 | 10 | 10 | 10 | 10 | 0 |
| | | | | | | 1 |

Merritt's Clustering into 10 clusters

Fig. 14

METHOD FOR EFFICIENT ASSOCIATION OF MULTIPLE DISTRIBUTIONS

CROSS-REFERENCES TO RELATED APPLICATIONS

This application claims the benefit of U.S. Provisional Patent Application No. 61/064,130, filed by Roy Gelbard, et al., on Feb. 19, 2008 and incorporated herein by reference.

TECHNICAL FIELD

The present invention relates to data analysis in general, and in particular to analyzing a dataset and dividing it into groups of similar objects.

BACKGROUND ART

The use of "grouping methods" (including but not limited to clustering, classification, recommendation, profiling, detection, and others), as methods of creating groups of objects such that objects in one group are similar (minimum within-group distance) and objects in different groups are distinct (maximum between-groups distance), is a common method in various areas of research such as computer science (e.g. pattern recognition), bio-information (e.g. patterns of protein's structure), marketing (e.g. market segmentation, user profiling, product-advertising recommendations), finance (e.g. fraud detection), manufacturing (e.g. faults and defects detection), organization and psychology (e.g. candidates and employees profiling).

However, studies thus far have applied a single algorithm (at a time) to determine the specific grouping of a phenomenon. Because of the unsupervised nature of grouping problems and the different groups resulted by using different algorithms on the same datasets, as well as the nature of several algorithms that may yield different solutions under permutations of the input order of the data; researchers and practitioners tend to decide on the number of groups, as well as the final decision concerning the association of borderline cases-objects without dedicated supportive decisions tools.

The use of grouping methods helps to identify significant trends in the dataset. Each group is comprised of relatively homogeneous objects (also referred to as cases, observations etc.). Objects in a group are similar to each other, and are also dissimilar to objects outside the group, according to the logic/methodology applied by the given grouping method.

For example, given a population of people, it is possible to divide them into different groups according to age groups, residential neighborhood, education, income etc. Each grouping method (criteria) may yield different groups. In many cases different grouping methods will result in similar groupings of the objects, thus identifying important trends about the objects. In the above example, it may well be possible that a given group of people will be identified by all (most) grouping criteria. An example may be the group of wealthy people, of older age, with higher education and living in a certain neighborhood.

Variations of analysis with the same purpose, e.g. dividing the dataset into groups, identifying people in a picture, identifying stock types in a stock exchange, etc. . . . , produce categorization of the dataset as interpreted by the grouping method. Since the grouping methods are different, similar but not identical interpretations can result.

Analyzing the results of different grouping methods is not a trivial task. It would be desirable to develop a method that can identify similarities between the groupings suggest by multiple grouping methods in order to produce an overall grouping recommendation. It would also be desirable to provide a two-dimensional visualization method in order to understand the similarities between the different grouping methods recommendations and the similarities of objects regarding the desired grouping, identifying outliers and hard to group objects.

Semi and unstructured decisions are frequently arise in daily applications such as hazards detection, marketing (recommendation, segmentation), finance (pricing), medicine (diagnostics).

In order to reach a well-established decision, in each of the above situations, there is a need to analyze it using several models, that is to say using several algorithms and parameters.

Currently, researchers must analyze each algorithm and parameter on an individual basis in order to establish preferences on the decision-making issues they face; because there is no supportive model or tool, which enables comparing different results, generated by these algorithms and parameters combinations.

The current invention enables not only visualization of results produced by diverse algorithms, but also quantitative analysis of the various results.

SUMMARY OF INVENTION

It is an object of the present invention to provide a grouping method based on the references provided by a plurality of grouping methods.

It is another object of the present invention to associate similar groups suggested by different grouping methods.

It is a further object of the present invention to present the references provided by a plurality of grouping methods in a two-dimensional matrix.

It is yet another object of the present invention to present the references provided by a plurality of grouping methods in a two-dimensional matrix including individual visual codes for each suggested grouping, for example, a color, an alphanumeric character or a visual sign.

The present invention thus relates to an association method of objects in a dataset using a plurality of grouping methods, such that objects from the same group are more similar to each other than objects from different groups, the method comprising the steps of:

(i) using references generated by a plurality of grouping methods on the objects of the dataset, wherein each grouping method assigns the objects into groups, such that objects from the same group are more similar to each other than objects from different groups;

(ii) associating similar groups suggested by different grouping methods; and (iii) determining the best grouping of said objects according to one or more quality criteria.

In a preferred embodiment, the association method further comprises the step of visualizing the results of the grouping methods. Preferably, the results of the grouping methods are visualized in a two-dimensional matrix representing the multi-dimensional aspects of the references generated by the plurality of grouping methods. For example, the matrix can comprise visual codes showing the groups suggested by the different grouping methods. The visual codes comprise assigning each association of similar groups with an individual color, an individual alphanumeric character, an individual sign or any combination thereof.

The association method of the invention can use any existing or future grouping methods including but not limited to: cluster analysis, classification, voting, detection, filtering, recommendations, profiling or any combination thereof.

The association method of the invention uses one or more quality criteria comprising homogeneity, heterogeneity, spreading, distribution or any combination thereof. Typically, the quality criteria are based on errors calculus or distance calculus or both. The quality criteria may naturally take into account other given criteria instead or in addition to error calculus and distance calculus.

In one embodiment of the present invention, the number of groups into which the data set is divided to, is predetermined in advance. Thus in some cases, it may be given that the data set is to be divided into a predetermined number of groups.

In another embodiment of the present invention, the number of groups into which the data set is divided to, is not predetermined in advance, and determining the best grouping of said objects is estimated using the following steps:

(i) setting a bottom value and a top value for the number of groups selected for the objects in the dataset, initializing the number of groups to the bottom value;

(ii) performing all requested grouping methods dividing the dataset into the current value of the number of groups;

(iii) associating similar groups suggested by different grouping methods;

(iv) calculating the quality criterion for said association;

(v) performing steps (ii) to (iv) on all permutations of the number of groups from the bottom value to the top value; and (vi) estimating the best association according to the optima reached by the quality criterion.

The above "brute force" methodology, though technically solid, may require in practice prohibitive computing resources when analyzing large datasets and a multiple grouping methods.

In a further embodiment of the present invention, the association method uses an optimization based on but not limited to local search family of optimizations, comprising the following steps:

(i) selecting a single arbitrary association;

(ii) calculate the quality criteria;

(iii) starting all over again using the current association as the initial association if a better quality criteria is reached;

(iv) repeating steps (ii)-(iii) on all single swaps from the initial association for a certain grouping method;

(v) performing steps (ii)-(iv) on all the grouping methods;

(vi) estimating the best association after all cases with a single swap from the initial association are covered.

In yet another embodiment of the present invention, the above optimization steps are repeated multiple times, selecting in step (i) a different arbitrary association, and selecting the association with the best quality criteria, such that the number of times can be determined by:

(i) a predetermined number of times; or (ii) until a predetermined number of times without improvement of the quality criteria is performed.

BRIEF DESCRIPTION OF DRAWINGS

FIG. 1 shows an example of a matrix visualizing the grouping of 8 objects into 3 groups based on the results of two grouping methods. Each row represents groups, each column represent a grouping method, and each cell presents the group's members according to the relevant grouping method.

FIG. 2 shows an example of a matrix visualizing the grouping of 12 objects (left column D) as grouped based on the results of 10 grouping methods (columns A1 to A10). A quality meter (column Q) is calculated for each object recommendation (for each row). Each number (in each cell) represents a grouping code defined by the relevant grouping algorithm (column) for the relevant object (row). Each gray scale color represents a similar group, even across grouping algorithms.

FIG. 3A shows a well-classified object (all the cells along the line have the same color); FIG. 3B shows a hard to classify object (cells along the line have different colors).

FIG. 4A shows an effective grouping method for a certain group; and FIG. 4B shows wrongly classified objects.

FIG. 6 is a matrix showing 19 countries of the Merritt's cross-culture study, grouped into 11 groups according to the invention.

FIG. 7 is a matrix showing 19 countries of the Hofstede's cross-culture study, grouped into 11 groups according to the invention.

FIG. 8 is a matrix showing 19 countries of the Merritt's cross-culture study, grouped into 4 groups.

FIG. 9 is a matrix showing 19 countries of the Merritt's cross-culture study, grouped into 5 groups.

FIG. 10 is a matrix showing 19 countries of the Merritt's dataset, grouped into 6 groups.

FIG. 11 is a matrix showing 19 countries of the Merritt's cross-culture study, grouped into 7 groups.

FIG. 12 is a matrix showing 19 countries of the Merritt's cross-culture study, grouped into 8 groups.

FIG. 13 is a matrix showing 19 countries of the Merritt's cross-culture study, grouped into 9 groups.

FIG. 14 is a matrix showing 19 countries of the Merritt's cross-culture study, grouped into 10 groups.

1. MODES FOR CARRYING OUT THE INVENTION

Figure 3A:
FIGS. 3A-3B illustrate different examples of visual clues about the distributions and different grouping algorithms suggestions.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Recommendations for dividing a dataset of objects into homogeneous groups can come from many sources such as statistical methods (such as regression, discriminate and factor analysis), cluster analysis methods, classification, voting by experts or by majority, patterns recognition and detection, filtering, recommendations, profiling or any method or combination of methods. The present invention relates to an association method for reviewing the different references (groups) suggested by multiple grouping methods, and identifying the best grouping of objects in the dataset.

The association method of the invention comprises three major steps. In the first step, multiple grouping methods of the art are used, each grouping method generating its own references of suggested grouping of objects. The source and nature of the grouping methods of used are left to the discretion of the user, who typically pays attention that the grouping method is relevant and important to the required analysis of the dataset. The method of the invention accepts as input any suggested grouping.

In the second step, the method of the invention examines the groups suggested by the different grouping methods and associates similar groups suggested by different grouping methods. It is important to note that each grouping method orders the group in its own way and thus the sequential number of a group is irrelevant. FIG. 1 shows a simple example of 8 objects (1 to 8) grouped into three clusters by two grouping methods: Algorithm A and Algorithm B. The association of similar groups among the two algorithms shows that cluster C1 of Algorithm A is similar (but not identical) to cluster C3 of algorithm B, as both contain the objects 2 and 3. The common objects are circled in red in FIG. 1. Similarly, cluster C2 of Algorithm A is similar (but not identical) to cluster C1 of algorithm B, as both contain the objects 4 and 5. The common objects are circled in green in FIG. 1. In addition, cluster C3 of Algorithm A is similar (but not identical) to cluster C2 of algorithm B, as both contain the objects 7 and 8. The common objects are circled in blue in FIG. 1. The association of the invention forms a referential integrity among the different grouping results, forming a "common language" for the results of different grouping methods.

In the third step, the best grouping of the objects is determined according to one or more quality criteria. Including but not limited to homogeneity, spreading, distribution or any combination thereof. The quality criteria used is typically based on errors or distance calculus or both.

In a preferred embodiment of the present invention, the method further comprises the step of visualizing the results of the grouping methods. Preferably, the visualization is done via a two-dimensional matrix representing the multi-dimensional aspects of the references generated by all the grouping methods ran against the dataset. In order to be able to distinguish the associations of similar groups among different grouping methods, the matrix preferably uses visual codes assigning each association of similar groups with an individual color, an individual alphanumeric character, an individual sign or any combination thereof.

Figure 2:
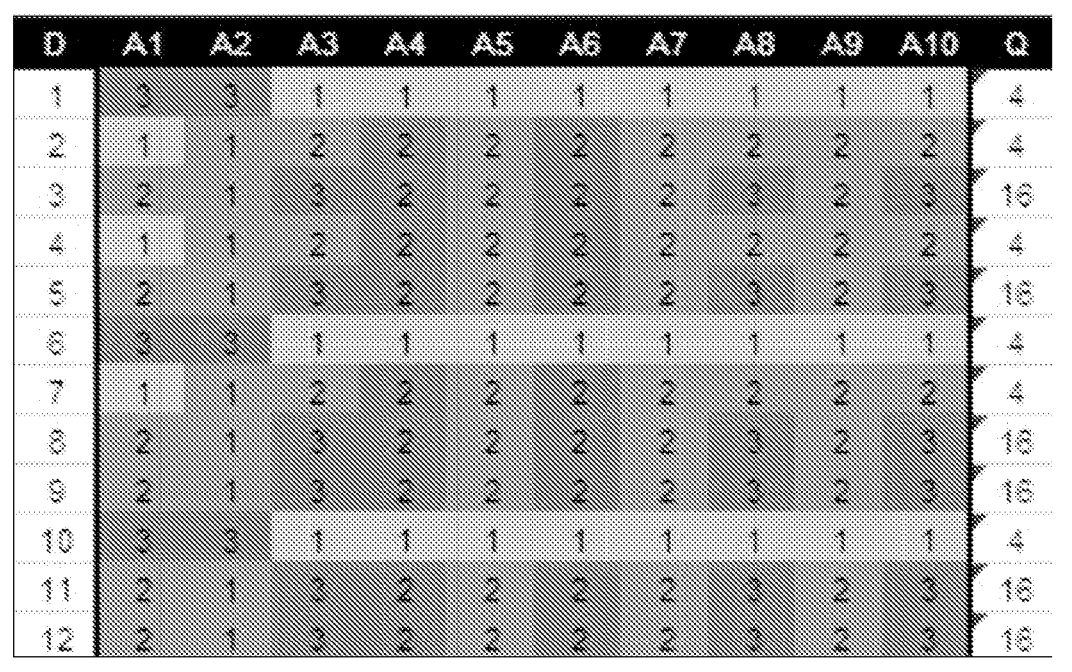

FIG. 2 shows an embodiment of such a matrix showing the results of 10 grouping methods (A1 to 10) analyzing 12 objects of a dataset (1 to 12). Each suggested distribution is presented in a column of the matrix, and each object (data component) is presented in a row of the matrix. The arbitrary tags that appear in each cell in the matrix are group codes made, independently, by each grouping method. While these tags are consistent for each column they are independent of the values in other columns of the matrix. The method of the invention is applied to the matrix and associates the arbitrary tags-codes to each other. A good example for presenting such an association is by using color codes. The colors are consistent over the matrix and similar colors, even on different rows, represent similar classification.

Figure 3B:
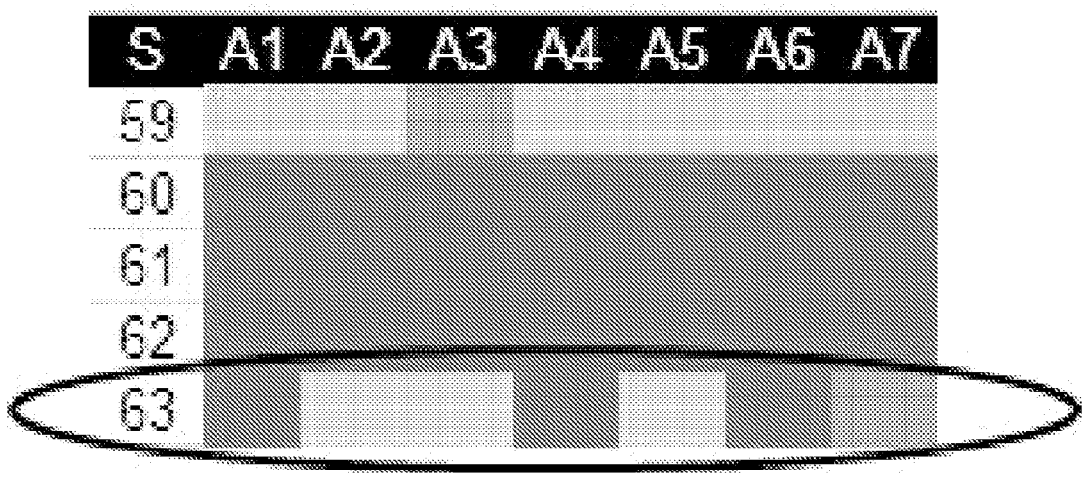

The visual codes in the matrix enable the viewer to immediately and intuitively understand the results of the different grouping methods and their relationship. FIG. 3A shows an example of a well classified object (68) which all the grouping methods have placed in the same group, shown in the green color. FIG. 3B illustrates an example of a hard to classify object, as object 71 has been selected to three different groups (shown as red, green and blue), without a dominant trend to a particular group.

Figure 4A:
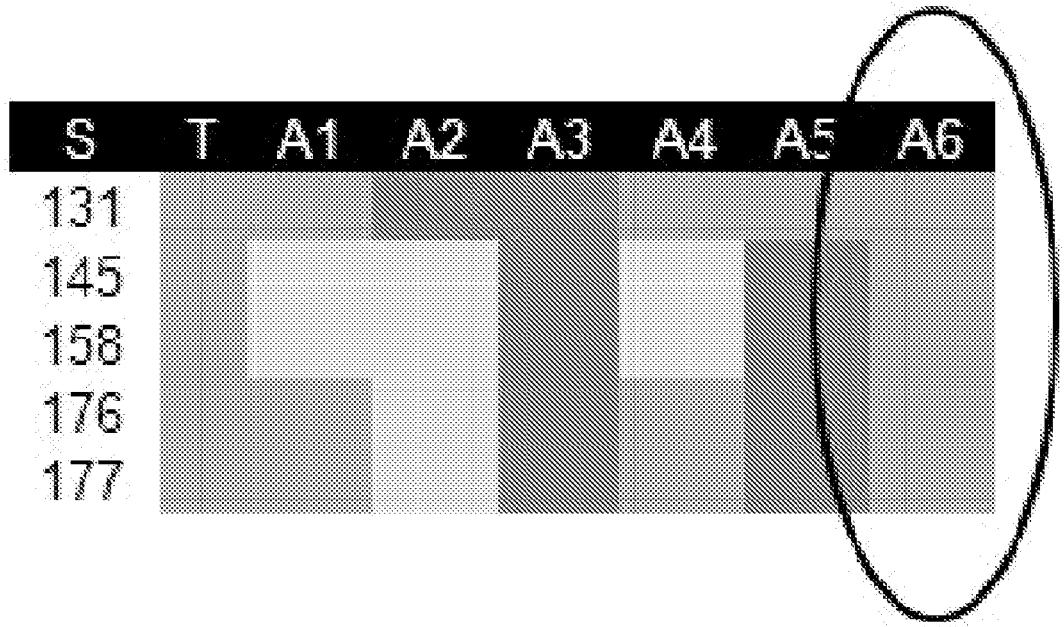
FIGS. 4A-4B illustrate cases where there is a restricted, pre defined grouping, defined in column T, and the objective is to evaluate the different grouping methods.
Figure 4B:
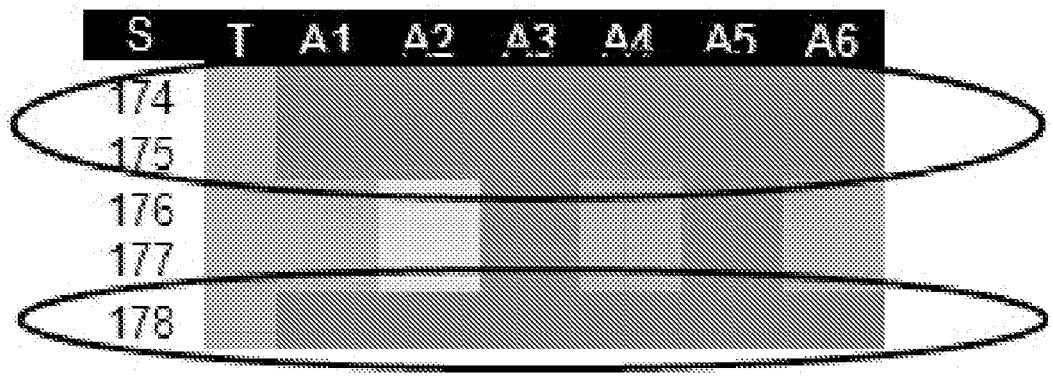

FIG. 4A s shows an example where there is a restricted, pre defined grouping, defined in column T, and the objective is to evaluate the different grouping methods. FIG. 4A shows an effective grouping method for a certain grouping. Grouping algorithm A6 has classified the five shown objects (131, 145, 158, 176 and 177) into the same group, shown as the red color. FIG. 4B illustrates another example where here there is a restricted, pre defined grouping, defined in column T, and demonstrates wrongly classified objects, as objects 174 and 178 result in the red group, while it is visually perceptible that most grouping methods placed them with the green group. FIGS. 4A and 4B refer to cases where there is a pre defined grouping and the objective is to evaluate the different grouping methods. This is especially relevant for a training stage (hence using T in the header) with the purpose to guide the system and/or the researcher in a learning stage.

The method of the invention calculates the quality of each association for each row, representing an object (data component). The quality is shown at the last column, Q. The quality can be calculated, but is not limited to, errors calculus, distance calculus, homogeneity, heterogeneity, spreading, distribution calculus or any combination thereof, as the Homogeneity of the association of a single data component over all the algorithms used in the analysis. Examples for methods for calculating the Homogeneity (or Heterogeneity) are illustrated, but are not limited to:

Number of errors—The number of algorithms that position the data component in a different than the most agreed upon association. This is a Heterogeneity meter.

Squared number of errors—The square of the number of algorithms that position the data component in a different than the most agreed upon association. This is a Heterogeneity meter.

Distance from second best—The difference between the number of algorithms associating the data component to the best association and the number of algorithms associating the data component to the second best association. This is a Homogeneity meter.

Squared distance from second best—The square of the number of algorithms that position the data component in a different than the most agreed upon association. This is a Homogeneity meter.

Finding the best association depends on the quality criteria used. To find the best association for Homogeneity criteria, one needs to maximize the quality meter over all the data components (objects). Similarly, to find the best association for Heterogeneity criteria, one needs to minimize the quality meter over all the data components (objects).

Figure 5:
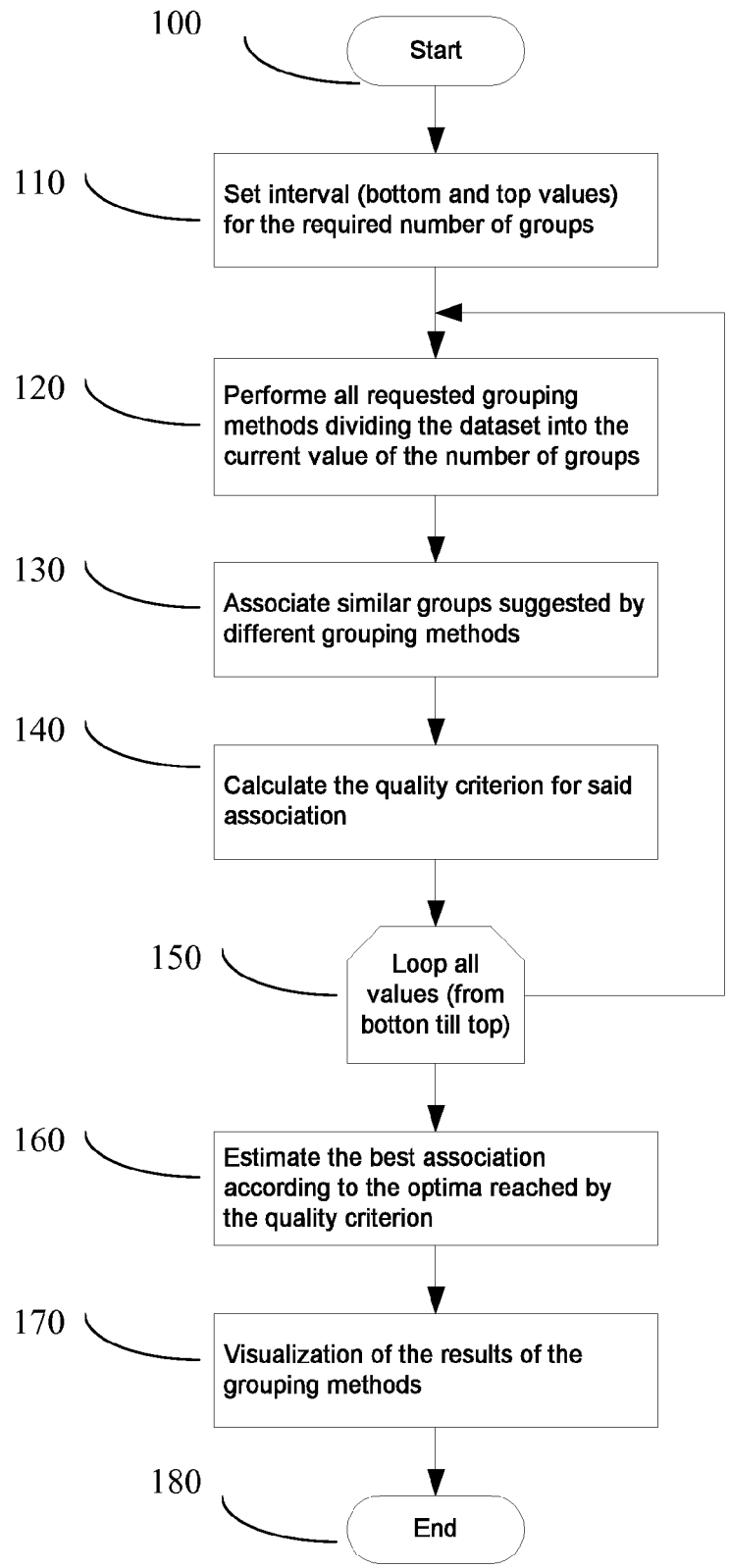
FIG. 5 is a flow chart for a "brute force" embodiment for calculating the best association of groupings according to the invention.

Several methods exist in order to calculate or estimate the best association. One way is to use "brute force" and to test all the possible associations in order to reach the best association. The following steps, as illustrated in FIG. 5, describe an embodiment of estimating the best association using a Heterogeneity meter:

In step 100, the operation starts and all arguments are initialized. In step 110, the interval (bottom value, top value) is set for the required number of groups. In step 120, we perform all requested grouping methods dividing the dataset into the current value of the number of groups. In step 130, we associate similar groups suggested by different grouping methods. In step 140, we calculate the quality criterion for each association of step 130. In step 150, we loop all values, performing steps 120 to 140 on all permutations of the number of groups from the bottom value to the top value. In step 160, we estimate the best association according to the optima reached by the quality criterion. Preferably (though optional), in step 170, we visualize the results of the grouping methods in a matrix.

Typically, even though a dataset with X objects can be divided theoretically into X−1 groups, in reality we will not try all theoretical permutations. The researcher typically decides in advance of range of permutations to fit the data (bottom value and top value), for example, to try and divide the dataset into 4 to 8 groups. The decision of the range of groups is normally based on knowledge about the domain and the grouping context.

Although the above "brute force" algorithm yields in theory a good result, its application in real life with large datasets and multiple grouping algorithms may be prohibitive due to the large computing resources required.

In another preferred embodiment of the present invention, an improvement is proposed to the method above by calculating an estimate to the best association. This estimation can be done by using optimization and/or heuristics method (including but not limited to local search, hill climbing etc.).

Table 1 shows pseudo code of local search algorithm, and interpretation of its terms to current grouping problem. The local search algorithm, as well as other optimization and heuristics methods, is used to illustrate a possible boosting method of the above "brute force", to yield an efficient association.

TABLE 1

Local-Search algorithm, and interpretation of its terms to current grouping problem Procedure Local-Search-Algorithm (problem) returns termination-state
    Domain:     problem, a problem
    Variables:   current, neighbor,, nodes
current ← Make-Node (Initial-State[problem])
For each neighbor of current Loop
    If Quality [neighbor] > Quality [current]   Then
        current ← neighbor
        Restart Loop
    End-If
End-Loop
Return State[current]
Remarks

| | |
|---|---|
| problem | in the current context refers to association of groups. |
| state | a node in the grouping permutation's space. |
| Initial-State | an initial node, which is a random grouping permutation. |
| current | starts in the Initial-State, and swaps into other nodes according to their Quality. |
| Quality | the rate (the value) of the Quality-Meter calculated for a specific permutation. |
| neighbor | an additional state (node) with a single change in current permutation. |
| Termination-State | local Optimum in terms of the Quality-Meter. |

A further improvement of this effective estimation for the distribution association is to perform the process multiple times or until no improvements are reached after a predetermined number of multiple activations of the process, starting each time from a new random arbitrary association. Since there are only a few local optima if at all, performing the operation multiple times will improve the probability to start from a point converging into the best optimum.

2. EXAMPLES 2.1 Data

Merritt's (Merritt, A., (2000). Culture in the cockpit. Do Hofstede's dimensions replicate? *Journal of Cross-Cultural Psychology,* 31, 283-301) study collected survey data from 9,400 male commercial airline pilots in 19 countries to assess Hofstede's cultural dimensions. The current example uses the raw pilots' score data as published in Merritt's study. Like Hofstede, Merritt used a single cluster analysis method, which was the average linkage between groups method.

2.2. Multi-Algorithm Voting of Cluster Analyses 2.2.1. Cluster Analysis Methods

The example uses a variety hierarchical clustering methods, as described below:

Average Linkage (within groups): This method calculates the distance between two groups by applying the likelihood measure to all the objects in the two groups. The groups with the best average likelihood measure are then associated.

Average Linkage (between groups): This method calculates the distance between two groups by applying the likelihood measure to all the objects of one group and then comparing it with all the objects of the other group. Once again, the two groups with the best likelihood measure are then associated.

Single Linkage (nearest neighbor): This method, as in the Average Linkage (between groups) method, calculates the distance between two groups by applying the likelihood measure to all the objects of one group and then comparing it with all the objects of the other group. The two groups with the best likelihood measure, from a pair of objects, are associated.

Median: This method calculates the median of each group. The likelihood measure is applied to the medians of the groups, after which the groups with the best median likelihood are then associated.

Ward: This method calculates the centroid for each group and the square of the likelihood measure of each object in both the group and the centroid. The two groups, which when associated have the smallest (negative) effect on the sum of likelihood measures, are the groups that need to be associated.

2.2.2. Grouping Analysis—Visualization of Multi-Algorithm Results

Results of hierarchical grouping analyses are usually visualized using dendrograms. A dendrogram is a tree-like graph that presents the entire "grouping space", i.e. the merger of groups from the initial case, where each object is a different group, to the total merger where the whole dataset is one group.

Although dendrograms are a popular tool, it is important to note that a dendrogram can only represent a single grouping method at a time and cannot compare or utilize multiple grouping algorithms simultaneously. Hence, a dendrogram cannot single out unusual cases and this may result in a misleading interpretation and/or inaccurate grouping.

To overcome these shortcomings, we used the method of the invention, also known as Multi-Algorithms Voting. Multi-Algorithms Voting is a decision support methodology for a cross-algorithm presentation in which all groups are presented together in a "tetris-like format". This "tetris-like format" contains columns and rows. Each column represents a specific grouping algorithm, each line represents a specific object (sample case), and each color represents a "vote" (i.e., decision suggestion, formed by a specific grouping algorithm for a specific object, creating visual "Tetris blocks" shapes).

The researcher can identify patterns and pattern components. Importantly, we seek to minimize the heterogeneity meter representing the voting consensus. A decision about which group a researcher should decide to adopt should be based on the level of heterogeneity vs. homogeneity. The sorted "tetris block" diagram gives the researcher a clear and explicit indication of which group should be adopted. As such, a group with the minimal heterogeneity (maximum homogeneity) should be adopted. This resolves the problem with arbitrary decisions where to draw the line in dendrograms.

2.2.3. Data Set Analysis

The example uses simultaneously five hierarchical grouping algorithms (Between Groups, Within Groups, Furthest Neighbor, Centroid, and Ward) to analyze the Merritt data set. Hierarchical cluster algorithms were used to match Merritt's methodology (which uses the Between Groups algorithm only) to enable a comparable test. The four additional hierarchical cluster algorithms were chosen because of the diverse nature of each one in terms of features examined and outcomes produced.

Figure 7:
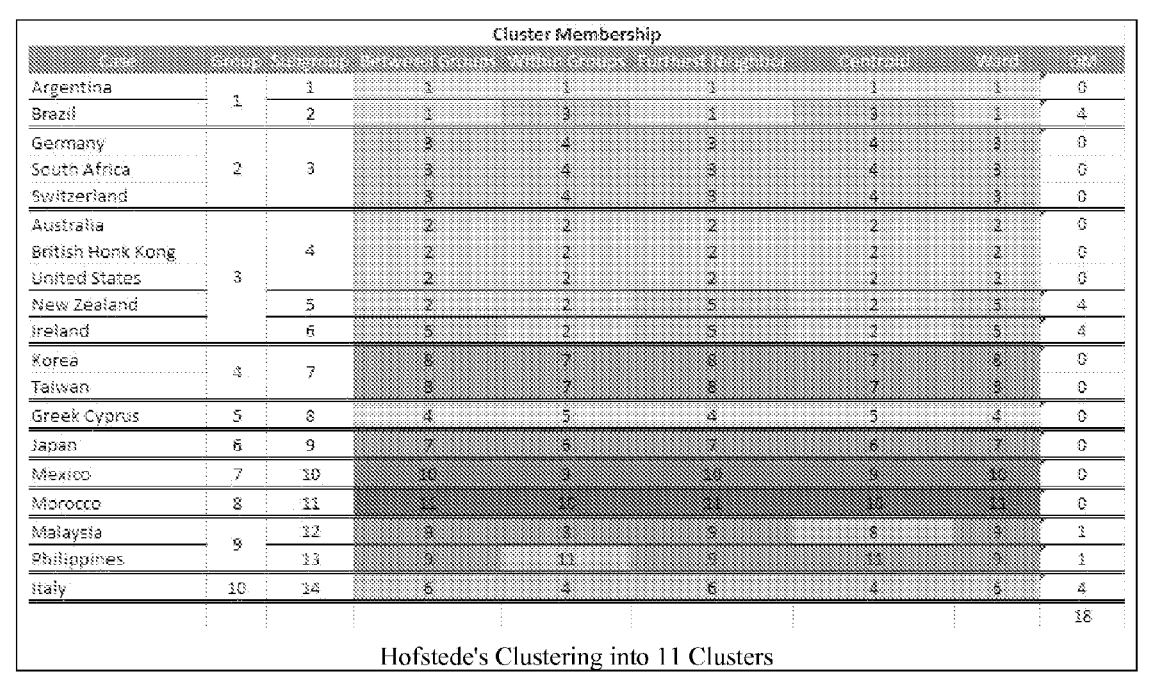

We performed nine rounds of analysis, using pre-assigned number of groups, from 4 to 12. In each one, all five hierarchical cluster algorithms were run. In each round of analysis the heterogeneity meter was estimated, and thus enabled us to determine whether a particular grouping should be accepted or revised. When we reached a voting consensus (minimized heterogeneity), we accepted the grouping (see FIG. 6). In order to follow Merritt's study, the parameter of the accepted grouping (i.e. the number of groups) was then applied to Hofstede original data score and ranking as presented in Merritt's article (see FIG. 7). The results of all other 8 rounds of analyses whose heterogeneity meter was above zero are presented in FIGS. 8 to 14. Finally, we compared the Hofstede and Merritt data outcomes (grouping) in terms of membership in each group.

3. Findings

The results of the heterogeneity meter, which are shown in Table 2, indicate that dividing the clustering into 11 groups yielded the maximal voting consensus. The minimized heterogeneity meter was zero (see Table 2, line 11). That is, all five grouping algorithms have supported the solution of 11 clustering groups outcomes.

Hofstede grouping results seem to be more consistent with other grouping of national cultures. For example, Ronen and Shenkar (1985, Clustering countries on attitudinal dimensions: A review and synthesis. *Academy of Management*

TABLE 2

The results of heterogeneity meter for each of the nine rounds of analysis

Figure 15:
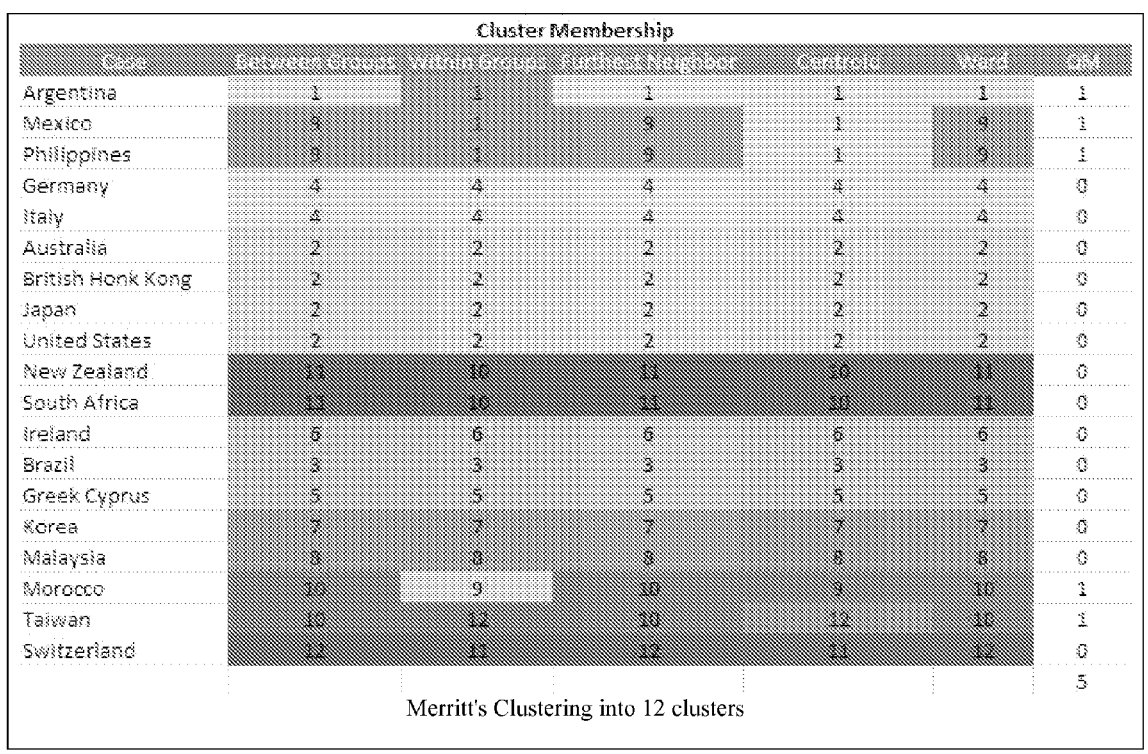
FIG. 15 is a matrix showing 19 countries of the Merritt's cross-culture study, grouped into 12 groups.

| The requested number of clusters in the analyzed round | Heterogeneity meter value | Notes* |
|---|---|---|
| 4 | 17 | Korea is considered as a single-country cluster with a ratio of 4 to 1 (see FIG. 8) |
| 5 | 23 | Korea is considered as a single-country cluster with a ratio of 4 to 1 (see FIG. 9) |
| 6 | 17 | Korea is considered as a single-country cluster with a ratio of 4 to 1 (see FIG. 10) |
| 7 | 9 | Morocco and Taiwan are clustered together in the same cluster with a ratio of 4 to 1 (see FIG. 11) |
| 8 | 7 | Switzerland, Cyprus and Malaysia: each one of them is a single-country cluster with a ratio of 4 to 1 (see FIG. 12) |
| 9 | 9 | Malaysia and Cyprus: each one of them is a single-country cluster with a ratio of 4 to 1 (see FIG. 13) |
| 10 | 1 | Ireland is clustered together with South Africa and New Zealand in the same cluster with a ratio of 4 to 1 (see FIG. 14) |
| 11 | 0 | All algorithms voted consensually |
| 12 | 5 | Philippines and Mexico are clustered together in the same cluster with a ratio of 4 to 1 (see FIG. 15) |

*Note: we provide examples for consensual voting

Table 3 presents side by side the results of Merritt's grouping into 11 groups and Hofstede's original data score and ranking (as presented in Merritt's article) according to the same parameter.

*Review*, 10, 435-454) suggested that Germany and Switzerland should be grouped together. The results of Merritt's data indicate that Germany and Italy are grouped in the same group whereas the results of Hofstede's data indicate that

TABLE 3

The clustering results of Merritt and Hofeste's data using an 11-cluster solution

| Cluster ID | According to Merritt's Data | According to Hofstede's Data |
|---|---|---|
| 1 | [redacted], Mexico, [redacted] | [redacted], [redacted] |
| 2 | [redacted] | Mexico |
| 3 | [redacted] | [redacted], [redacted] |
| 4 | [redacted], Italy | [redacted], [redacted], [redacted] |
| 5 | [redacted] | Italy |
| 6 | New Zealand, [redacted] | New Zealand, British Honk Kong, Australia, United States |
| 7 | Ireland | Ireland (3 votes for single-country cluster, and 2 votes for the Anglo-Saxon cluster) |
| 8 | [redacted], British Honk Kong, Australia, United States | [redacted] |
| 9 | Greek Cyprus | Greek Cyprus |
| 10 | [redacted], Morocco | [redacted], [redacted] |
| 11 | [redacted] | Morocco |

The findings show that there are substantial differences between the grouping results of the Merritt and Hofstede data sets. First, Hofstede's grouping results create a number of dilemmas because of the relatively high heterogeneity meter (see FIG. 6). For instance, in the grouping of Ireland three grouping algorithms voted that this country should be viewed as a single-country group. However, the additional two grouping algorithms voted in support of grouping Ireland with Anglo-Saxon Countries (New Zealand, British Hong Kong, and the USA). Second, unlike Merritt's clustering the Germany should be grouped into the same group with Switzerland and South Africa. In addition, according to the results of Hofstede's data, Argentina and Brazil are grouped in the same group whereas the results of Merritt's data indicate Brazil should be seen as a single-country group, and Argentina should be grouped with Mexico and the Philippines. However, the Philippines, according to the results of Hofstede's data, should be grouped with Malaysia whereas Malaysia, according to the results of Merritt's data, is viewed as a single-country groupe. According to the results of Hofstede's data, Taiwan should be in the same groupe with Korea. However, according to the results of Merritt's data, Taiwan is grouped with Morocco and Korea is a single-country groupe. Finally, the results of Hofstede's data suggest that Japan should be viewed as a single-country groupe whereas according to Merritt's data results Japan is grouped together with the Anglo-Saxon countries.

4. Discussion

The goal of this example was to overcome three main shortcomings in using a single grouping-analysis algorithm to determine a particular grouping of a phenomenon: (i) The arbitrary decision about the number of groups (consequences from the unsupervised nature of grouping). (ii) The lack of a comparison method and tool to compare outputs of different grouping algorithms. (iii) Limited insight of each specific case-sample and possible interpretations of its analysis-classification.

The methodology of Multi-Algorithm Voting (MAV) of the invention and its visualization offer a rigorous method that prevents arbitrary degrees of freedom regarding the decision about the number of groups and their members, on one hand, and provides more validated output from which one can make more appropriate theoretical implications; thus enabling a better understanding of group homogeneity and sources of influence.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:
1. A method of grouping objects in a dataset, comprising:
  (a) setting a bottom value and a top value for the number of groups selected for the objects in the dataset, initializing the number of groups to the bottom value;
  (b) performing each of a plurality of different grouping methods on the objects in the dataset, with each of said grouping methods dividing the dataset into the current value of the number of groups and with each of said grouping methods grouping all of the objects of the dataset into a set of groups such that objects within the same group are more similar to each other than objects within different groups within the number of groups and wherein each object is placed only into a single group within the set of groups of each grouping method;
  (c) analyzing the results of said different grouping methods in order to detect similarities among groups in different sets of groups;
  (d) associating similar groups that appear in different sets of groups, based on the similarities detected in step (c);
  (e) calculating a quality criterion for said association of step (d);
  (f) performing steps (b) to (e) on all instances of the number of groups from the bottom value to the top value; and
  (g) constructing an improved grouping of the dataset based on the associations of step (d) and the best number of groups according to the optima reached by the quality criterion of step (e).

2. A method according to claim 1, further comprising the step of visualizing the results of the grouping methods.

3. A method according to claim 2, wherein said results of the grouping methods are visualized in a two-dimensional matrix representing the multi-dimensional aspects of the references generated by said plurality of grouping methods.

4. A method according to claim 3, wherein said matrix comprises visual codes showing the groups suggested by the different grouping methods.

5. A method according to claim 4, wherein the visual codes comprise assigning each association of similar groups with an individual color, an individual alphanumeric character, an individual sign or any combination thereof.

6. A method according to claim 1, wherein the grouping methods comprise: cluster analysis, classification, voting, detection, filtering, recommendations, profiling or any combination thereof.

7. A method according to claim 1, wherein said one or more quality criteria comprise homogeneity, heterogeneity, spreading, distribution or any combination thereof, said quality criteria further comprising errors or distance calculus or both.

8. A method according to claim 1, based on optimization or heuristics methods or both, in order to make an effective and efficient association.

9. A method according to claim 8, based on local search family of optimizations, comprising the following steps:
   (A) selecting a single arbitrary association;
   (B) calculating the quality criteria;
   (C) starting all over again using the current association as the initial association if a better quality criteria is reached;
   (D) repeating steps (B)-(C) on all single swaps from the initial association for a certain grouping method;
   (E) performing steps (B)-(D) on all the grouping methods; and
   (F) selecting the most improved association after all cases with a single swap from the initial association are covered.

10. A method according to claim 9, wherein the procedure of claim 9 is repeated a predetermined number of times, or until a predetermined number of times is performed without improvement of the quality criteria.

11. A non-transitory computer-readable medium encoded with a program module that groups objects in a dataset by performing the steps of the method of claim 1.

12. A medium according to claim 11, further comprising the step of visualizing the results of the grouping methods.

13. A medium according to claim 12, wherein said results of the grouping methods are visualized in a two-dimensional matrix representing the multi-dimensional aspects of the references generated by said plurality of grouping methods.

14. A medium according to claim 13, wherein said matrix comprises visual codes showing the groups suggested by the different grouping methods, such that the visual codes assign each association of similar groups with an individual color, an individual alphanumeric character, an individual sign or any combination thereof.

15. A medium according to claim 11, wherein the grouping methods comprise: cluster analysis, classification, voting, detection, filtering, recommendations, profiling or any combination thereof.

16. A medium according to claim 11, wherein said one or more quality criteria comprise homogeneity, heterogeneity, spreading, distribution or any combination thereof, said quality criteria further comprising errors or distance calculus or both.

17. A medium according to claim 11, based on local search family of optimizations, comprising the following steps:
   (A) selecting a single arbitrary association;
   (B) calculating the quality criteria;
   (C) starting all over again using the current association as the initial association if a better quality criteria is reached;
   (D) repeating steps (B)-(C) on all single swaps from the initial association for a certain grouping method;
   (E) performing steps (B)-(D) on all the grouping methods; and
   (F) selecting the most improved association after all cases with a single swap from the initial association are covered.

18. A method of grouping objects in a dataset, comprising:
   (a) analyzing the results of different grouping methods, wherein each of said grouping methods groups all of the objects of the dataset into a set of groups such that objects from the same group are more similar to each other than objects from different groups within a set of groups and wherein each object is placed only into a single group within the set of groups of each grouping method, in order to detect similarities among groups in different sets of groups;
   (b) associating similar groups that appear in different sets of groups, based on the similarities detected in step (a); and
   (c) constructing an improved grouping of the dataset based on the associations of step (b),
      wherein said analyzing step comprises visualizing the results of the grouping methods in a two-dimensional matrix representing the multi-dimensional aspects of the groups generated by said plurality of grouping methods.

19. A method according to claim 18, wherein the number of groups into which the dataset is divided is predetermined in advance.

20. A non-transitory computer-readable medium encoded with a program module that groups objects in a dataset by performing the steps of the method of claim 18.

* * * * *